United States Patent Office 3,182,036
Patented May 4, 1965

3,182,036
PLASTICIZED POLY-BETA-HYDROXYBUTYRIC ACID AND PROCESS
James N. Baptist, Clarksville, and Frank X. Werber, Kensington, Md., assignors to W. R. Grace & Co., a corporation of Connecticut
No Drawing. Filed Aug. 20, 1962, Ser. No. 218,097
4 Claims. (Cl. 260—32.4)

This invention relates to polymer compositions of poly-beta-hydroxybutyric acid. In one specific aspect, it relates to plasticized compositions of bacterial poly-beta-hydroxybutyric acid.

Beta-hydroxybutyric acid is a known chemical compound. It is also known that a great variety of bacteria are able to synthesize a polymer of this compound. The polymer has been studied in relation to bacteria to determine such things as method of synthesis and its function in the bacterial cell. However, little is known of its properties as a plastic.

Poly-beta-hydroxybutyric acid can be molded into brittle useful articles. However, since it is often desirable for plastic articles to be flexible and elastic, the need arises for a plasticizer which will impart these properties to the polymer. Plasticizers for bacterial poly-beta-hydroxybutyric acid have not heretofore been known.

We have found that it is possible to plasticize bacterial poly-beta-hydroxybutyric acid and obtain a material that can be formed into flexible films, filaments, tubes and the like.

It is an object of this invention to provide plasticized compositions of bacterial poly-beta-hydroxybutyric acid. It is a further object to provide soft and flexible polymer compositions of bacterial poly-beta-hydroxybutyric acid and to obtain molding temperatures below the decomposition point of the polyester.

We have found certain classes of compounds that are satisfactory plasticizers for bacterial poly-beta-hydroxybutyric acid. These plasticizers, all of which should boil over 200° C. are the following: organic esters, polyesters, polyethers, chlorinated polyphenyls and cyano compounds.

It should be noted that several factors must be considered in the selection of a suitable plasticizer. Ordinarily, a plasticizer should be a compound of low volatility so that it will not evaporate quickly from the plastic.

While the polyethers and cyano compounds plasticize poly-beta-hydroxybutyric acid very well, they are somewhat volatile and therefore are not effective for a long period of time. The preferred plasticizers of our invention, then, are the esters, polyesters and chlorinated polyphenyls.

Members of these groups which we have found to be effective include the following:

*Esters.*—Phthalates formed from alcohols containing 2–10 carbon atoms; phenyl and cresyl phosphate esters; adipates, azelates and sebacates formed from alcohols containing 4–10 carbon atoms.

*Polyesters.*—Condensation products of dicarboxylic acids containing 4 or more carbon atoms and glycols.

*Chlorinated polyphenyls.*—Commercially available under the name of Aroclor.

*Polyethers.*—Polyethylene glycol and polypropylene glycol.

*Cyano compounds.*—Phenylacetonitrile and 1,8-dicyano-octane.

In practicing this invention, between 0.1–50% by weight, with the preferred range being 10–35% by weight, of a plasticizing compound is mixed with poly-beta-hydroxybutyric acid. The mixing may be accomplished by dissolving both the polymer and the selected plasticizer in a suitable solvent, such as chloroform or methylene chloride. The solvent is then allowed to evaporate, leaving behind a plasticized poly-beta-hydroxybutyric acid capable of being formed into a soft, flexible, non-brittle film with an elongation at yield point of over 5%. Any suitable method of mixing the plasticizer and polymer can be used however. Both mechanical means such as a Banbury mixer or heat such as in slush molding have been found quite adequate.

The polymer used in this invention was synthesized by Rhizobium bacteria growing in a glucose medium. However, any one of the large number of bacteria known to produce this polyester could be used for the synthesis. Bacterial poly-beta-hydroxybutyric acid can be characterized as a high molecular weight material with a tensile strength above 4500 p.s.i., a modulus of 210,000 to 415,000 p.s.i. depending on the rate of pull, and an elongation at yield point of 2–5%. Total elongation is approximately 6.5%.

The invention will be further explained by the following specific but non-limiting examples.

*Example I*

Poly-beta-hydroxybutyric acid was synthesized by a species of Rhizobium grown in flasks containing 45 ml. of culture medium on a rotary shaker. The culture medium consisted of 4% glucose and 0.1% yeast extract in a standard mineral solution. The mineral solution contained the following:

|  | G./l. |
|---|---|
| $(NH_4)_2SO_4$ | 0.50 |
| $KH_2PO_4$ | 0.50 |
| $Na_2HPO_4 \cdot 7H_2O$ | 0.945 |
| $MgSO_4$ | 0.10 |
| $CaCl_2$ | 0.01 |
| $FeCl_3$ | 0.005 |

The bacteria were allowed to grow until high turbidities were obtained in each flask. The cultures were then centrifuged and extracted with pyridine. Poly-beta-hydroxybutyric acid was precipitated from the pyridine extract with ether, filtered and dried. The polymer dried in a powdered form. Samples of the polymer and plasticizer were weighed as follows:

| Wt. polymer, g. | Plasticizer | Wt. plasticizer, g. | Wt. percent of plasticizer |
|---|---|---|---|
| 0.2070 | Tricresyl phosphate | 0.1025 | 49.5 |
| 0.1946 | Di-n-octyl phthalate | 0.0704 | 36.2 |
| 0.2121 | Di-n-butyl sebacate | 0.1143 | 53.9 |
| 0.2171 | Di butyl phthalate | 0.1012 | 46.6 |

The polymer and plasticizer in each case were mixed well together by hand stirring. Since all the plasticizers used in this example are liquids at room temperature, no solvent was needed. Three blank samples of polymer were prepared and treated in the same way as those with plasticizer.

Each sample was molded into a film at 355° F. for 15 seconds at 20,000 p.s.i. The plasticized films were flexible, elastic and able to bend without breaking. The unplasticized films broke under this treatment.

The films were examined visually after three days and there was no noticeable separation of plasticizer from polymer. After one year, the films were again examined and the plasticizer and polymer were still compatible.

*Example II*

Six grams of polymer obtained as in Example I were dissolved in 250 ml. of chloroform. This was filtered and then diluted to 250 ml. A 25.0 ml. sample of this chloroform solution was mixed with 0.1942 g. of tri-n-butyl citrate. The chloroform solution of polyester and plasticizer was poured onto a plate and the solvent allowed to evaporate.

A control sample was prepared by pouring 25 ml. of the chloroform solvent solution of polyester, without plasticizer, onto a plate and the solvent evaporated.

These two samples were molded into films using the technique described in Example I. The two films were annealed for two hours at 130° C. and then the following properties determined: tensile modulus; stress at yield point; elongation at yield point; stress at failure; and elongation at failure.

These properties were determined on an Instron tensile tester at 23° C. and 50% relative humidity. Sample size was ¼ inch by 4 inches. The gage length of the sample was 2 inches. The sample was pulled at a cross head travel rate of 1 inch per minute giving a strain rate of 50% per minute.

Results of the tests were as follows:

|  | Control sample | Plasticized sample |
| --- | --- | --- |
| Concentration of plasticizer, percent | None | 32 |
| Tensile modulus | 415,000 | 113,000 |
| Stress at yield point, p.s.i | 5,300 | 1,700 |
| Elongation at yield point, percent | 3.5 | 16 |
| Stress at failure, p.s.i | 5,200 | 770 |
| Elongation at failure, percent | 4.4 | 28 |

*Example III*

A sample of di-n-butyl sebacate weighing 0.4002 gram was mixed with 50 ml. of the chloroform solution of poly-beta-hydroxybutyric acid prepared in Example II. This sample was poured onto a plate and the chloroform allowed to evaporate. The residue was molded into a film, annealed, and tested as in Example II using the same control sample. The following results were obtained:

|  | Control sample | Plasticized sample |
| --- | --- | --- |
| Concentration of plasticizer, percent | None | 33 |
| Tensile modulus | 415,000 | 108,000 |
| Stress at yield point, p.s.i | 5,300 | 1,400 |
| Elongation at yield point, percent | 3.5 | 12 |
| Stress at failure, p.s.i | 5,200 | 1,400 |
| Elongation at failure, percent | 4.4 | 44 |

*Example IV*

0.3013 g. of Aroclor 4465 was mixed with 49 ml. of the chloroform solution of the polymer prepared in Example II. Aroclor 4465 is a transparent yellow brittle resinous chlorinated polyphenyl having a specific gravity of 1.712 to 1.723 at 25° C. and a distillation range of 230 to 320° C. at 4 mm. of mercury. The mixture was poured onto a plate and the chloroform evaporated. A film was molded from the sample by casting it at 355° F. for 5 minutes at 20,000 p.s.i. The film was annealed and then tested as in Example II with the following results:

|  | Control sample | Plasticized sample |
| --- | --- | --- |
| Concentration of plasticizer, percent | None | 25 |
| Tensile modulus | 415,000 | 238,000 |
| Stress at yield point, p.s.i | 5,300 | 3,500 |
| Elongation at yield point, percent | 3.5 | 9 |
| Stress at failure, p.s.i | 5,200 | 3,400 |
| Elongation at failure, percent | 4.4 | 33 |

*Example V*

0.408 g. of 1,8-dicyano-octane was mixed with 50 ml. of the chloroform solution of poly-beta-hydroxybutyric acid prepared in Example II. This sample was poured onto a plate and the chloroform evaporated. It was then molded into a film, annealed, and tested as in Example II using the same control sample. The following results were obtained:

|  | Control sample | Plasticized sample |
| --- | --- | --- |
| Concentration of plasticizer, percent | None | 34 |
| Tensile modulus | 415,000 | 47,000 |
| Stress at yield point, p.s.i | 5,300 | 1,670 |
| Elongation at yield point, percent | 3.5 | 110 |
| Stress at failure, p.s.i | 5,200 | 1,500 |
| Elongation at failure, percent | 4.4 | 130 |

*Example VI*

A 2% by weight solution of poly-beta-hydroxybutyric acid in $CHCl_3$ was prepared. A 10 ml. sample of this solution was mixed with each of the following plasticizers:

(a) 0.903 g. Aroclor 4465
(b) 0.1038 g. Aroclor 1221
(c) 0.1029 g. Aroclor 1242
(d) 0.1023 g. phenylacetonitrile
(e) 0.1024 g. polyethylene glycol
(f) 0.1019 g. γ-butylrolactone Each of the mixtures was poured into a Petri dish and the chloroform allowed to evaporate. The material dried in the form of films which were observed to be flexible, elastic and were stable after 30 days. The films were examined after one year and those containing plasticizers (a) and (c) still retained these properties.

Stability of the plasticized film was determined by visual observation. In the time noted, there was no apparent crystallization of plasticizer nor any oozing of plasticizer onto the surface of the film.

Aroclor 4465 used in this example is the same as that described in Example IV. Aroclor 1221 is a colorless, mobile, oily chlorinated polyphenyl having a specific gravity of 1.177 to 1.187 at 25° C. and a distillation range of 275 to 320° C. Aroclor 1242 is an almost colorless oily chlorinated polyphenyl having a specific gravity of 1.378 to 1.388 at 25° C. and a distillation range of 325 to 360° C.

We claim:

1. A bacterial poly-beta-hydroxybutyric acid plasticized with a cyano compound selected from the group consisting of phenylacetonitrile and 1,8-dicyano-octane.

2. A bacterial poly-beta-hydroxybutyric acid having in its untreated form an elongation at yield point of 2–5%, plasticized with a cyano compound selected from the group consisting of phenylacetonitrile and 1,8-dicyano-octane, said plasticized composition being characterized by an elongation at yield point of over 5%.

3. A bacterial poly-beta-hydroxybutyric acid having in its untreated form an elongation at yield point of 2–5% plasticized with a cyano compound selected from the group consisting of phenylacetonitrile and 1,8-dicyano-octane, said plasticizer being added in concentrations of 0.1 to 50 weight percent, said plasticized composition being characterized by an elongation at yield point of over 5%.

4. A process for plasticizing bacterial poly-beta-hydroxybutyric acid comprising the steps of mixing the bacterial polyester with 0.1 to 50 weight percent of a cyano compound selected from the group consisting of phenylacetonitrile and 1,8-dicyano-octane in a suitable solvent for both, evaporating the solvent and recovering as product the residue, said product being characterized by an elongation at yield point of over 5%.

References Cited by the Examiner

UNITED STATES PATENTS 3,022,263   2/62   Orthner et al. _____ 260—34.2
3,044,942   7/62   Baptist _____ 195—47

OTHER REFERENCES

Levine et al.: (University of California, Berkeley), J. Bacteriol. 79, 305–6 (1960), or Chemical Abstracts, vol. 54, 19847 g.

MORRIS LIEBMAN, *Primary Examiner.*

ALEXANDER H. BRODMERKEL, *Examiner.*